United States Patent [19]
Cheng

[11] Patent Number: 5,669,466
[45] Date of Patent: Sep. 23, 1997

[54] FRONT WHEEL FOR A HANDCART

[76] Inventor: Chin-chang Cheng, No. 20, Lane 327, Sec. 2, Chungshan Rd., Chungho City, Taipei Hsien, Taiwan

[21] Appl. No.: 593,832

[22] Filed: Jan. 30, 1996

[51] Int. Cl.$^6$ ............................................. B60B 33/02
[52] U.S. Cl. ................................. 188/112; 16/35 R
[58] Field of Search .................... 188/1.12; 16/35 R, 16/35 D, 44

[56] References Cited

U.S. PATENT DOCUMENTS

| 3,636,586 | 1/1972 | Bollenger et al. | 16/35 R |
| 3,751,758 | 8/1973 | Higbee et al. | 16/35 R |
| 4,349,937 | 9/1982 | Fontana | 16/35 R |
| 4,805,259 | 2/1989 | Kassai | 188/1.12 |

FOREIGN PATENT DOCUMENTS

| 1144064 | 10/1956 | Germany | 16/35 R |
| 2204441 | 9/1973 | Germany | 16/35 R |
| 1231381 | 5/1977 | United Kingdom | 188/1.12 |
| 2269095 | 2/1994 | United Kingdom | 16/35 R |

*Primary Examiner*—Matthew C. Graham
*Attorney, Agent, or Firm*—Oppenheimer Poms Smith

[57] ABSTRACT

A front wheel structure for a handcart includes a link block having a wheel bracket pivotally attached to an underside thereof with a wheel being rotatably retained in the wheel bracket. A positive stop is slidingly received in a vertical slot defined in the link block and has a head formed at a top end on a first side thereof and a lip formed at a bottom on the first side. In an uppermost position of the positive stop, the bottom thereof is above a sidewall of the wheel bracket such that the wheel bracket can pivot freely. In a lowermost position of the positive stop, the bottom thereof impedes the sidewall of the wheel bracket such that it cannot pivot. A brake is pivotally attached at a top of the wheel bracket and can urge against a periphery of the wheel to.

5 Claims, 6 Drawing Sheets

FRONT WHEEL FOR A HANDCART

BACKGROUND OF THE INVENTION

1. Field of the Invention

The present invention relates to a front wheel structure, and more particularly to a handcart.

2. Description of Related Art

Handcarts are popular devices for shopping etc. It is found that conventional hand carts fall into two categories of wheel types—fixed and pivotable.

The pivotable type has the advantage of good maneuverability, enabling the cart to be steered easily around obstacles, corners etc. but has the disadvantage of, when being used on a sidewalk with a transverse incline, it is difficult to prevent the handcart from veering away from the intended longitudinal path of travel. Although the fixed wheel type overcomes the disadvantage of undesired drift it lacks the maneuverability required in a crowded environment. A conventional handcart is shown in FIGS. 6 and 7. The handcart comprises two rear wheels 91 pivotally disposed to the rear end, a handle 92, two front wheels 94 disposed between both ends of the handle 92, a pivot rod 93 and a base rod 95 located above the pivot rod 93.

As shown in FIG. 7, when the handcart is in erected, a bottom front end of the handcart frame is rested on the base rod 95, whereby the handcart frame is supported only by the base rod 95.

However, by such an arrangement, there are still a few shortcomings in the conventional handcart. Firstly, the front wheels 94 are rigidly fitted to handle 92, so it is difficult to turn the handcart; secondly, the handcart has no brake means; thirdly, as the handcart frame is only supported by a base rod 95, the load carrying capacity is not sufficient.

Thus, there has been a long and unfulfilled need for a hand cart which is able to be adjusted from a pivotable status to a fixed wheel status when the local environment requires it.

The present invention has arisen to mitigate and/or obviate the above-mentioned disadvantages of the conventional handcart.

SUMMARY OF THE INVENTION

The primary objective of the present invention is to provide a front wheel structure for a handcart which can be switched between a fixed state and a pivotable state and has a sufficient load carrying capacity.

Another objective of the present invention is to provide a front wheel structure for a handcart which has a brake function.

In accordance with one aspect of the present invention, there is provided a front wheel structure for a handcart which comprises a link block having an extension portion with a first hole vertically defined in a bottom thereof, a slot vertically defined inside of said link block, a positive stop movably inserted into the slot of the link block, a front wheel assembly, and an axle rotatably attached to the top of the wheel assembly by a bearing, said axle received in the first hole of the link block.

The link block has a protrusion portion formed on a rear end thereof, the protrusion portion having a second hole transversely defined therein and a sleeve extending from a top end thereof.

Additionally, the front wheel assembly includes a wheel bracket, a front wheel rotatably disposed in the wheel bracket and a brake block pivotally attached to the wheel bracket by a pivot rod.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
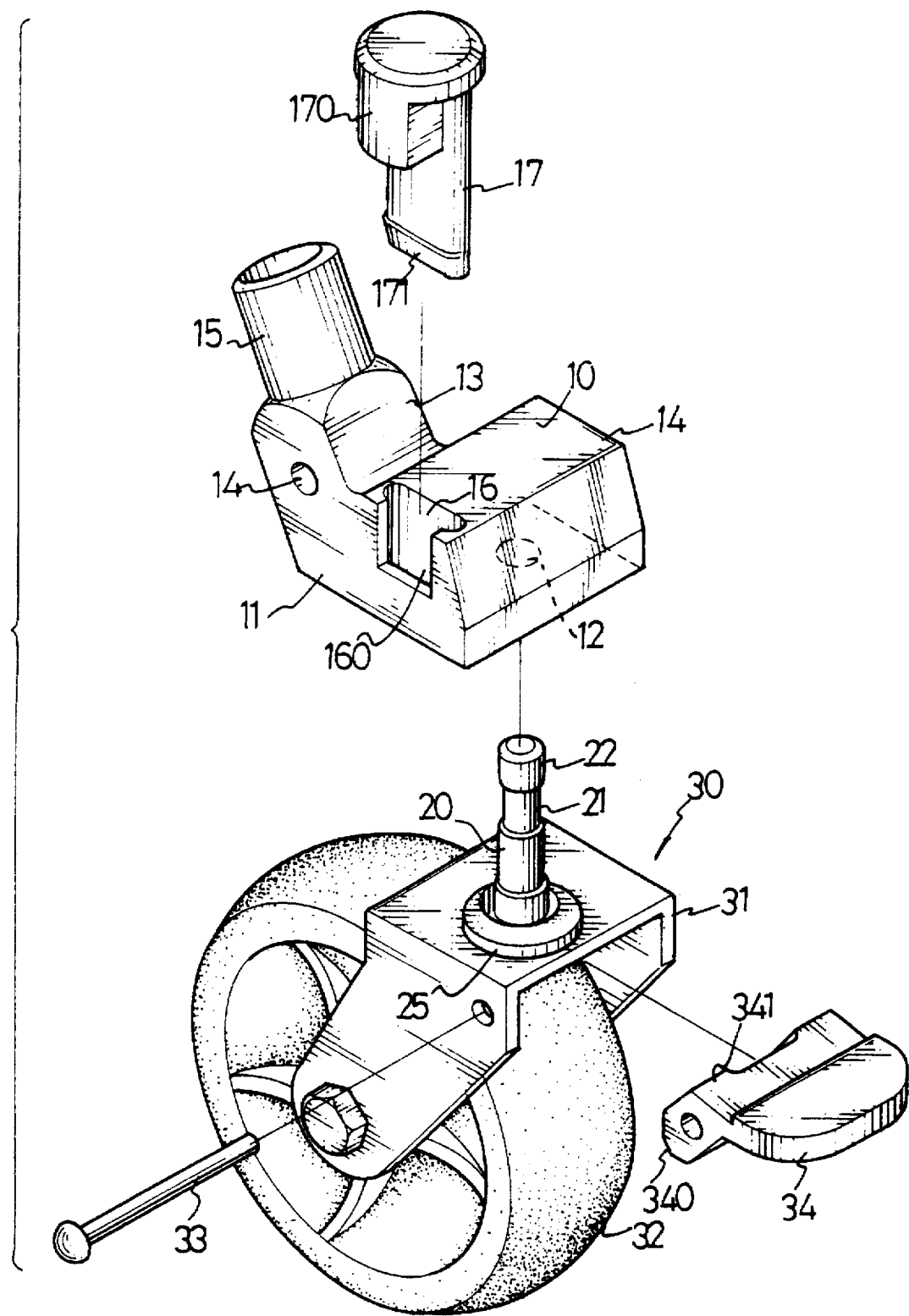
FIG. 1 is an exploded view of a front wheel structure for a handcart in accordance with the present invention.
Figure 2:
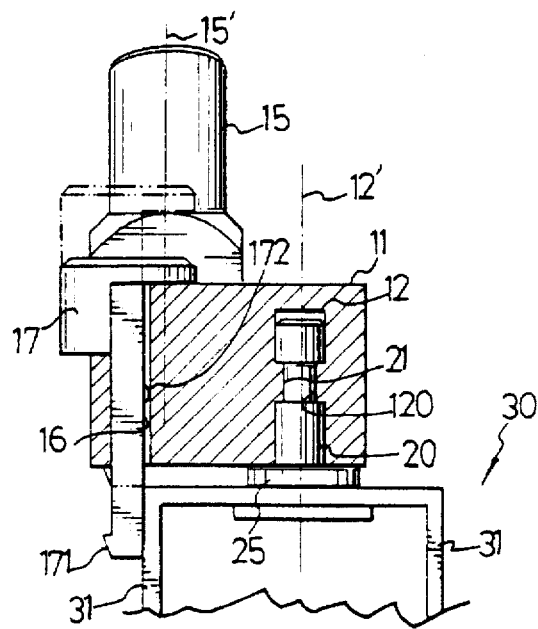
FIG. 2 is a cross-sectional view of the front wheel structure in accordance with the present invention.
Figure 3:
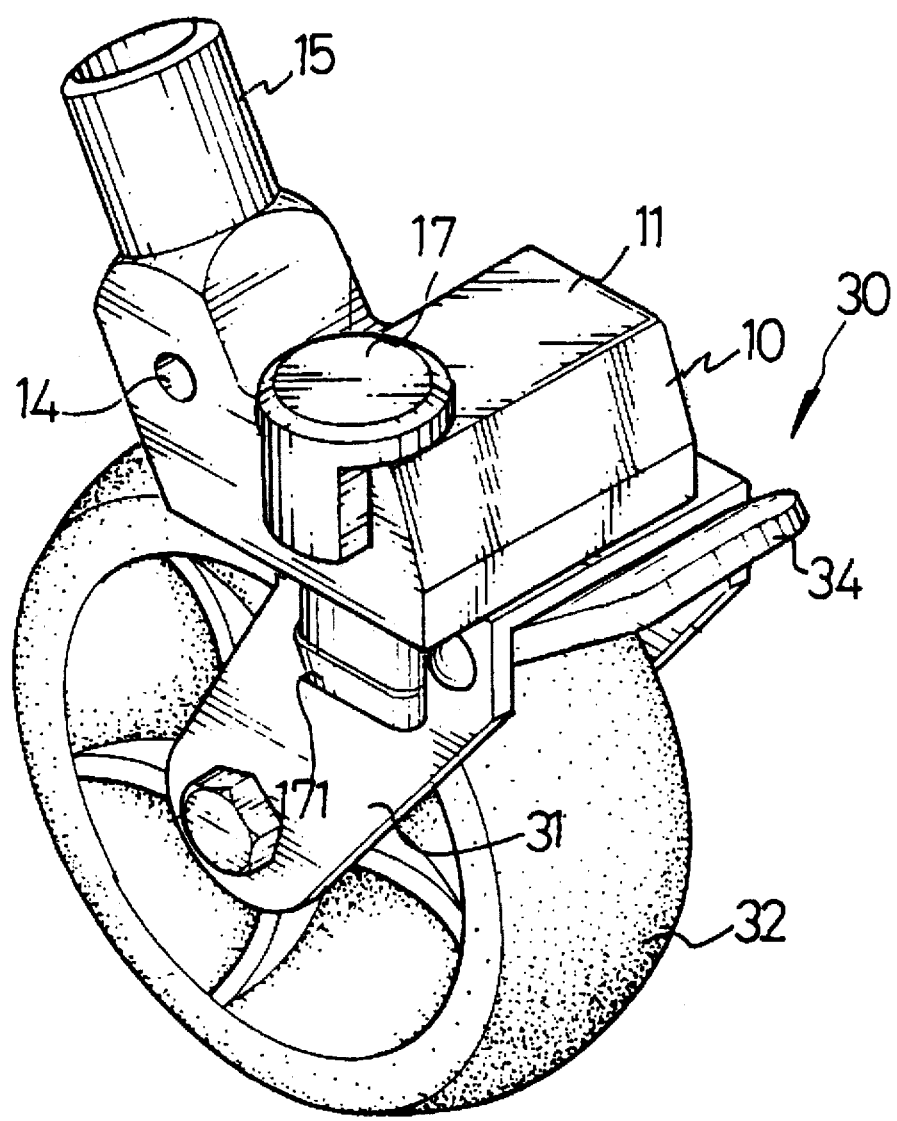
FIG. 3 is a perspective view of the front wheel structure as shown in FIG. 1.

Referring to FIGS. 1–5, and initially to FIGS. 1–3, a front wheel structure in accordance with the present invention is provided for a handcart which comprises a link block 10, an axle 20, and a wheel assembly 30.

The link block 10 is preferably made of plastic material. The link block 10 has an extension portion 11 with a first hole 12 vertically defined therein and in communication with a bottom thereof. The link block 10 has a protrusion portion 13 upwardly and obliquely formed on a rear portion thereof. A second hole 14 is transversely defined through the protrusion portion 13 and a sleeve 15 extends integrally from a top end of the protrusion portion 13. A periphery defining the first hole 12 has a neck portion 120 which has an inner diameter smaller than a diameter of the first hole 12. A longitudinal axis 12' of the first hole 12 is offset from a longitudinal axis 15' of the sleeve 15, as shown in FIG. 2.

Furthermore, a slot 16 is vertically defined inside of the link block 10 near a first sideface thereof. An opening 160 which is in communication with the slot 16 is defined in the first sideface of the link block 10. A positive stop 17 is received in the slot 16. A thickness of the positive stop 17 is slightly smaller than a width of the slot 16, whereby the positive stop 17 can be slidingly received in the slot 16. Additionally, the positive stop 17 has a head portion 170 formed on a first side thereof and a body portion. When the positive stop 17 is completely received in the slot 16, the head portion 170 is received within the opening 160 for limiting downward travel of the positive stop 17. As shown in FIG. 2, the positive stop 17 has a resilient lip 171 formed on a bottom of the first side of the body portion thereof for preventing the positive stop 17 from being completely extended out of the slot 16. A ridge 172 is formed on an upper end of a second side opposite to the first side of the positive stop 17, the ridge 172 butts against an inner wall defining the slot 16 for retaining the positive stop 17 in an upper most position. When the positive stop 17 is in a lower most position, a lower end thereof extends beyond the bottom of the link block 10 and butts against a first sidewall of a wheel bracket 31 to impede the wheel bracket 31 from pivoting freely. When the positive stop 17 is moved to an upper most position the lower end of the positive stop 17 is disengaged from the side wall of the wheel bracket 31, the wheel bracket 31 can pivot freely again.

The wheel assembly 30 is fitted to the link block 10 by the axle 20 extending therethrough. The axle 20 projects upwardly from a top of the wheel bracket 31 and is offset towards the first side thereof. A bearing 25 is disposed between the axle 20 and the wheel assembly 30, whereby the axle 20 can rotate smoothly with respect to wheel assembly 30. The axle 20 has a diameter slightly smaller than the diameter of the first hole 12 of the link block 10. A recess 21 is sized and shaped in the axle 20 to receive the neck portion 120. It is to be noted that resilience in the materials from which the axle 20 and the link block 10 are made permits a distal tip of the axle to extend beyond the neck portion 120. The neck portion 120 can urge against the axle 20 when the axle 20 extends through the first hole 12 until the neck portion 120 is received within the recess 21 of the axle 20, whereby the axle 20 can be securely received within the first hole 12 (as shown in FIG. 3).

As stated earlier the wheel assembly 30 includes the wheel bracket 31 which comprises a front wheel 32 and a brake block 34. The wheel bracket 31 is substantially U-shaped in form and the front wheel 32 is rotatably disposed therein. The brake block 34 has a first end and a second end and is pivotally attached to the wheel bracket 31 by a pivot arm 33 transversely extending through the first end. The brake block 34 has a first inclined face 340 and a second inclined face 341 formed on an inner face at the first end thereof, whereby the first inclined face 340 is receivable against a peripheral surface of the front wheel 32. The second inclined face 341 is sized and shaped to be received by an underface of the wheel bracket 31. The brake block 34 has an extension portion which extends beyond the wheel bracket 31 enabling the user to control the brake block 34.

Figure 4:
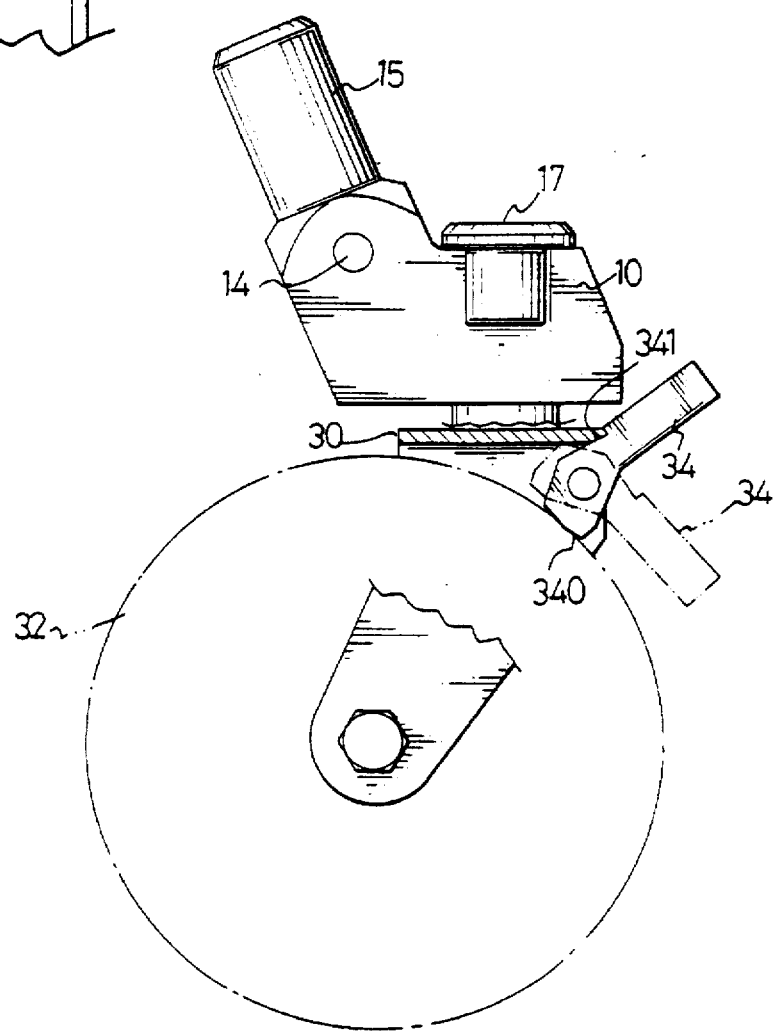
FIG. 4 is an operational view showing the relationship of the brake block and the front wheel.

As shown in FIG. 4, weight distribution of the brake block 34 result in the second thereof being inclined downwardly such that the break block 34 is disengaged from the wheel 32 and the wheel is free to rotate, as shown in phantom line. When the brake block 34 is urged to move upwardly by the user, the second end of the brake block 34 is positioned higher than the first end thereof such that the first inclined face 340 butts against the peripheral surface of the wheel 32 and the second inclined face 341 butts against a front end of the underface of the wheel bracket 31 to limit rotation of the wheel 32. The wheel 32 is subsequently released to rotate by means of pushing the wheel assembly 30 in a direction opposite to an original direction of travel without needing to directly operate the brake block 34.

Figure 5:
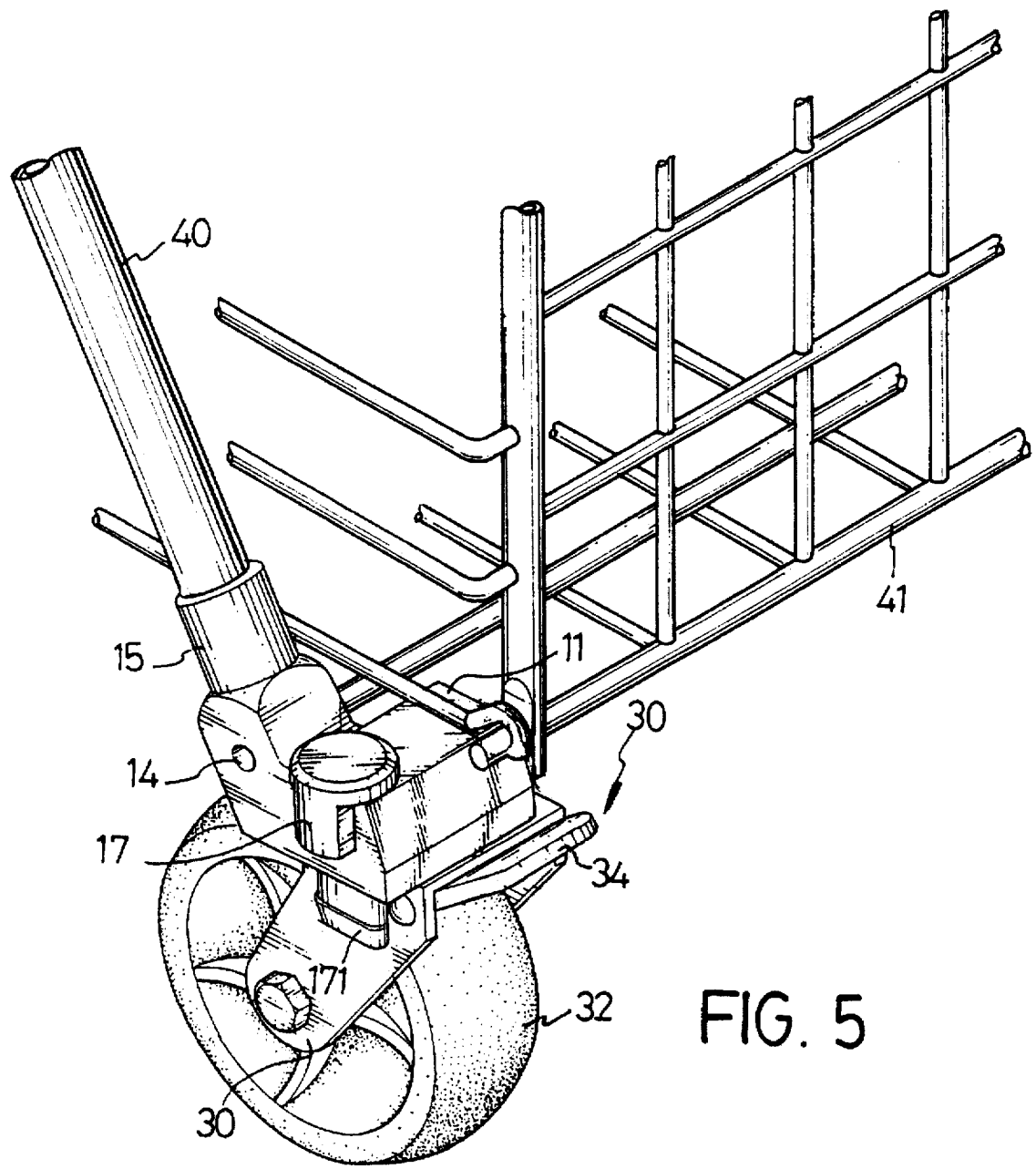
FIG. 5 is a perspective view of the front wheel structure in accordance with the present invention attached to the handcart.
Figure 6:
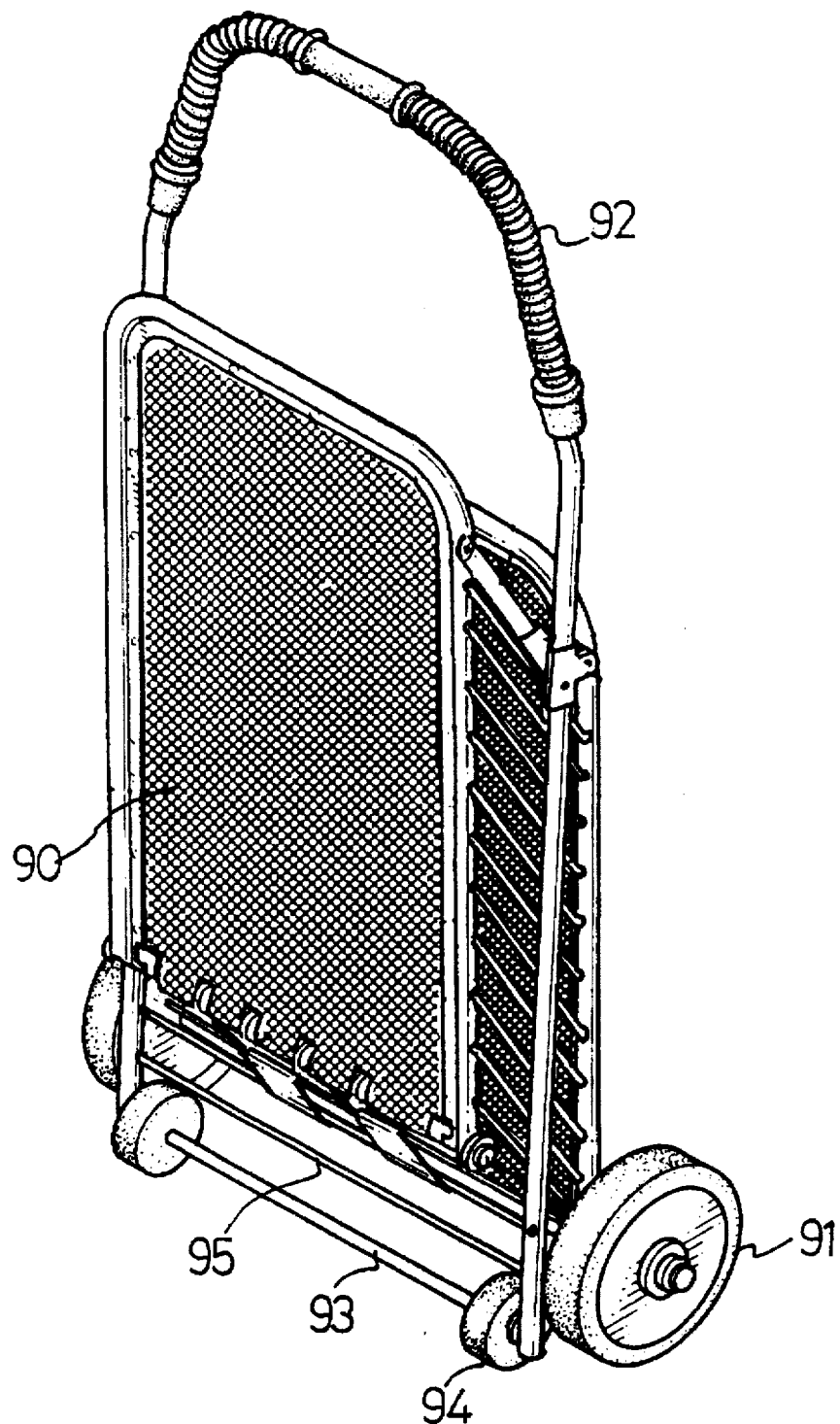
FIG. 6 is a perspective view of a conventional handcart in closed configuration.
Figure 7:
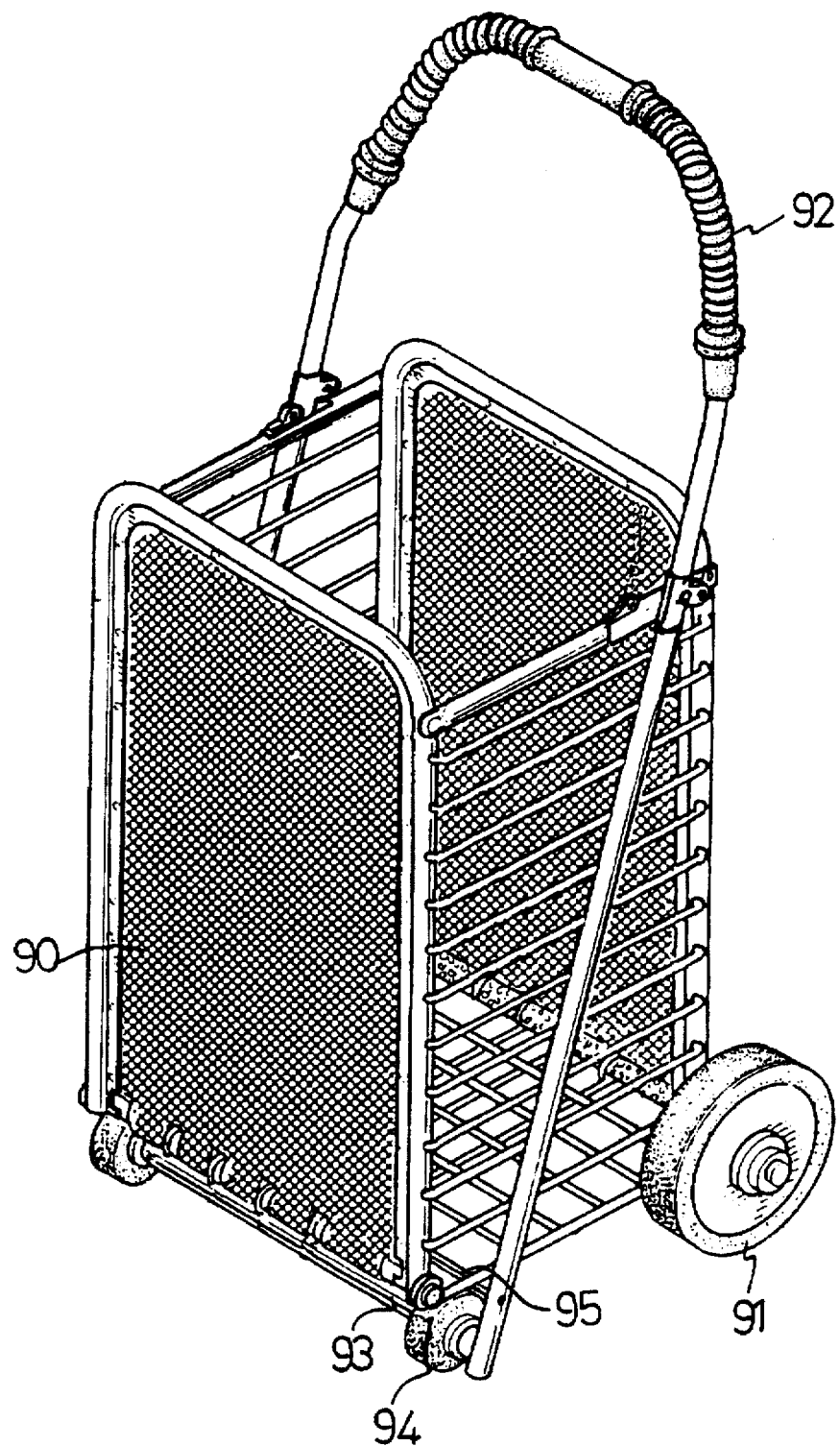
FIG. 7 is a perspective view of the conventional handcart of FIG. 6 in erected configuration.

Referring to FIG. 5, showing the present invention fitted to the handcart, a push rod 40 of the handcart is inserted into the sleeve 15 of the link block 10 and each end of a strut 42 disposed at the bottom of the handcart frame 41 is received in the second hole 14. Simultaneously, a bottom corner of the handcart frame 41 is rested on the extension portion 11 of the link block 10.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A front wheel structure for a handcart comprising:
   a link block comprising an extension portion with a first hole vertically defined in a bottom thereof, a protrusion portion formed on a rear end thereof, the protrusion portion defining a second hold transversely extending therethrough and a sleeve extending upwardly and obliquely from the protrusion portion for being fixedly attached to a frame of the handcart at a first end thereof;
   a wheel assembly having a wheel attachment means pivotally coupled to a second end of the link block, and a wheel rotatably retained in the wheel attachment means;
   a brake means operably connected to a first end of the wheel attachment means to selectively engage with the wheel and brake it; and arresting means operably received in the link block and the link block further including a slot vertically defined near a first face thereof for receiving the arresting means, and an opening defined in the first side and in communication with the slot,
   thereby the arresting means being selectively movable between a lowermost position, at which a bottom end of the arresting means engages with the wheel attachment means to thereby prevent the wheel assembly from freely pivoting relative to the link block, and an uppermost position, at which the arresting means disengages form the wheel attachment means to free the wheel from being constrained.

2. The front wheel structure for a handcart as claimed in claim 1 wherein the arresting means is a positive stop comprising a body portion, a head portion formed at a top of a first side thereof and matingly received in the opening of the link block to hold the positive stop in the lowermost position, a lip formed at a bottom of the first side thereof and being engagable with a bottom of the link block to prevent the positive stop from leaving the slot when moving upward, and a ridge formed on a second side opposite to the first side and butting against an inner wall defining the slot to hold the stop in the uppermost position.

3. The front wheel structure for a handcart as claimed in claim 2 wherein an axis of the sleeve offsets from an axis of the first hole of the link block.

4. The front wheel structure for a handcart as claimed in claim 1, wherein the wheel attachment means includes an axle extending vertically upward and which is pivotally received in the second hole of the link block.

5. A front wheel structure for a handcart comprising:
   a link block fixedly attached to a frame of the handcart at a first end thereof;
   an arresting means operably received in the link block;
   a wheel assembly having a wheel attachment means pivotally coupled to a second end of the link block, and a wheel rotatably retained in the wheel attachment means;
   a brake means operably connected to a first end of the wheel attachment means to selectively engage with the wheel and brake it thereby;
   the arresting means being selectively movable between a lowermost position, at which a bottom end of the arresting means engages with the wheel attachment means to thereby prevent the wheel assembly from freely pivoting relative to the link block, and an uppermost position, at which the arresting means disengages from the wheel attachment means to free the wheel from being constrained, said link block comprising an extension portion with a first hole vertically defined in a bottom thereof, a slot vertically defined near a first face thereof for receiving the arresting means, an opening defined in the first side and in communication with the slot, a protrusion portion formed on a rear end thereof, the protrusion portion defining a second hole transversely extending therethrough and a sleeve extending upwardly and obliquely from the protrusion portion for coupling to the frame of the handcart.

\* \* \* \* \*